(12) United States Patent
Chang

(10) Patent No.: US 11,738,735 B2
(45) Date of Patent: Aug. 29, 2023

(54) METHOD FOR WARNING SUFFICIENCY OF A PARKING BRAKING FORCE

(71) Applicants: HYUNDAI MOTOR COMPANY, Seoul (KR); KIA MOTORS CORPORATION, Seoul (KR)

(72) Inventor: Hwi-Bong Chang, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 608 days.

(21) Appl. No.: 16/672,070

(22) Filed: Nov. 1, 2019

(65) Prior Publication Data

US 2020/0247382 A1     Aug. 6, 2020

(30) Foreign Application Priority Data

Feb. 1, 2019   (KR) ................ 10-2019-0013447

(51) Int. Cl.
| | |
|---|---|
| *B60T 17/22* | (2006.01) |
| *G07C 5/08* | (2006.01) |
| *B60Q 9/00* | (2006.01) |
| *B60T 7/04* | (2006.01) |
| *B60T 7/08* | (2006.01) |

(52) U.S. Cl.
CPC ............ *B60T 17/221* (2013.01); *B60Q 9/002* (2013.01); *B60T 7/04* (2013.01); *B60T 7/08* (2013.01); *G07C 5/08* (2013.01); *B60T 2210/20* (2013.01); *B60T 2220/04* (2013.01); *B60T 2250/00* (2013.01); *B60T 2250/02* (2013.01)

(58) Field of Classification Search
CPC ...... B60T 17/221; B60T 7/08; B60T 2210/20; B60T 2220/04; B60T 2250/00; B60T 2250/02; B60T 8/885; B60T 2270/406; B60T 7/042; B60T 7/085; B60T 17/22; B60T 7/102; B60T 8/18; B60T 8/245; B60T 8/56; B60T 2201/06; B60T 7/04; F16D 69/00; F16D 65/566; B60Q 9/002; G07C 5/08; B60K 35/00; B60Y 2400/90; B60Y 2400/304
USPC ......................................... 701/70
See application file for complete search history.

(56) References Cited

U.S. PATENT DOCUMENTS

| | | | | |
|---|---|---|---|---|
| 7,383,928 | B2 * | 6/2008 | Leboisne | B60T 13/746 188/158 |
| 7,628,459 | B2 * | 12/2009 | Herges | B60T 17/083 188/138 |
| 8,326,509 | B2 * | 12/2012 | Logan | B60T 17/22 303/191 |
| 9,610,931 | B2 * | 4/2017 | O'Meachair | B60T 8/172 |
| 9,789,857 | B2 * | 10/2017 | Kim | B60T 7/22 |
| 9,975,529 | B2 * | 5/2018 | Lemmer | F16D 65/18 |

(Continued)

FOREIGN PATENT DOCUMENTS

| | | | | |
|---|---|---|---|---|
| DE | 102016115275 A1 * | 2/2018 | ............ | B60T 17/22 |
| KR | 10-0779849 B1 | 11/2007 | | |

*Primary Examiner* — Krishnan Ramesh
(74) *Attorney, Agent, or Firm* — Fox Rothschild LLP

(57) ABSTRACT

A method for warning sufficiency of a parking braking force may include operating a parking pedal or parking lever mounted on a vehicle; confirming a brake state of the vehicle; measuring a slope of the place where the vehicle is located; calculating an actual parking braking force of the vehicle and a required parking braking force of the vehicle; and determining whether the actual parking braking force is smaller than the required parking braking force.

5 Claims, 7 Drawing Sheets

(56) References Cited

U.S. PATENT DOCUMENTS

| | | | |
|---|---|---|---|
| 10,391,985 B2* | 8/2019 | Misumi | B60T 8/171 |
| 10,857,891 B2* | 12/2020 | Lee | B60L 7/26 |
| 11,084,479 B2* | 8/2021 | Kikkawa | F16D 66/021 |
| 2007/0158999 A1* | 7/2007 | Leboisne | B60T 13/588 |
| | | | 303/3 |
| 2008/0121473 A1 | 5/2008 | Kang | |
| 2008/0149437 A1* | 6/2008 | Herges | B60T 17/221 |
| | | | 188/138 |
| 2010/0235065 A1* | 9/2010 | Logan | B60T 17/22 |
| | | | 701/80 |
| 2015/0239448 A1* | 8/2015 | O'Meachair | B60T 8/171 |
| | | | 701/70 |
| 2017/0113667 A1* | 4/2017 | Kim | B60T 7/22 |
| 2017/0267220 A1* | 9/2017 | Serra | B60T 8/172 |
| 2017/0282790 A1* | 10/2017 | Pan | B60T 17/22 |
| 2018/0043867 A1* | 2/2018 | Lemmer | B60T 13/662 |
| 2018/0065629 A1* | 3/2018 | Wolff | B60W 10/08 |
| 2018/0148022 A1* | 5/2018 | Misumi | B60T 8/171 |
| 2019/0092174 A1* | 3/2019 | Lee | B60T 13/662 |
| 2019/0100191 A1* | 4/2019 | Kikkawa | F16D 66/021 |

\* cited by examiner

METHOD FOR WARNING SUFFICIENCY OF A PARKING BRAKING FORCE

CROSS-REFERENCE(S) TO RELATED APPLICATIONS

The present application claims priority to and the benefit of Korean Patent Application No. 10-2019-0013447, filed on Feb. 1, 2019, which is incorporated herein by reference in its entirety.

FIELD

The present disclosure relates to a method for warning sufficiency of a parking braking force, and more particularly, to a parking braking force warning method for warning a vehicle slip after parking.

BACKGROUND

The statements in this section merely provide background information related to the present disclosure and may not constitute prior art.

A vehicle is equipped with wheel that transmits driving torque to the ground. The wheel is provided with a brake for reducing a vehicle speed. The brake includes a brake disc synchronized with the rotation of the wheel and a brake pad which rubs against the brake disc to reduce the rotational force of the wheel.

On the other hand, in addition to the brake, the vehicle also has a parking brake for preventing wheel rotation during parking. The parking brake is an electronic parking brake and a mechanical parking brake. The mechanical parking brake among them prevents rotation of the wheel by continuously operating the brake mounted on the non-driving wheel.

FIGS. 1 to 3 show the mechanical parking brake. The mechanical parking brake 1 includes a parking pedal 2 located in the driver's leg room, a parking cable 3 extending from the parking pedal 2 and a ramp structure 6 of a ball in ramp (BIR) type mounted on a caliper 4 for operating the brake pad 5 and connected with a parking cable 3.

When the parking cable 3 is pulled by operation of the parking pedal 2, as shown in FIG. 2, the ramp structure 6 is rotated. As shown in FIG. 3, the caliper 4 operates by rotation of the ramp structure 6 so that the brake pad 5 presses the brake disk 7.

However, the mechanical parking brake 1 as described above uses a brake which is used for deceleration during driving the vehicle as a parking brake when the vehicle is parked. When the vehicle is rapidly decelerated during high speed driving and is parked on a ramp, there was a concern that the vehicle would be pushed down along the ramp.

This is because temperatures of the brake disk 7 and the brake pad 5 are raised by friction between the brake disk 7 and the brake pad 5 at the time of rapid deceleration and the brake coefficient of the brake pad 5 is deteriorated by the temperature rise. As the friction coefficient of the brake pad 5 decreases, the braking force imposed by the brake during parking is smaller than usual.

The foregoing is intended merely to aid in the understanding of the background of the present disclosure, and is not intended to mean that the present disclosure falls within the purview of the related art that is already known to those skilled in the art.

SUMMARY

The present disclosure provides a parking braking force warning method that can prevent a vehicle from being pushed down along a ramp even if the vehicle is rapidly decelerating during high speed driving and parked on the ramp.

A parking braking force warning method in some forms of the present disclosure in order to achieve the above objects may include, operating, by a driver, a parking pedal or parking lever mounted on a vehicle; confirming, by a controller, a brake state of the vehicle; measuring, by the controller, a slope of the place where the vehicle is located; calculating, by the controller, an actual parking braking force of the vehicle and a required parking braking force of the vehicle; and determining, by the controller, whether the actual parking braking force is smaller than the required parking braking force.

Further, the confirming, by the controller, the brake state of the vehicle may include measuring or estimating, by the controller, a temperature of the brake disk mounted on the vehicle; deriving, by the controller, the friction coefficient of the brake pad mounted on the vehicle with the temperature of the brake disk; and measuring, by the controller, the degree of manipulation of the parking pedal or the parking lever as a stroke sensing value, wherein a pressurizing force by which the brake pad presses the brake disc is calculated with the stroke sensing value, by the controller.

Furthermore, the slope may be calculated from the signal generated by an acceleration sensor mounted on the vehicle.

In addition, the actual parking braking force may be calculated from a vehicle weight, the slope, the derived friction coefficient of the brake pad and the pressurizing force.

Additionally, the required parking braking force may be calculated from a vehicle weight and the slope.

Also, operating, by the driver, the parking pedal or the parking lever mounted on the vehicle again, recalculating, by the controller, the actual parking braking force; and determining again, by the controller, whether the recalculated actual parking braking force is smaller than the required parking braking force, may be further included.

In addition, the driver may be alerted, by the controller, to vehicle slip when the actual parking braking force or the recalculated actual parking braking force is smaller than the required parking braking force.

Additionally, the warning may be displayed as a warning phrase on an instrument panel of the driver's seat or as a warning sound on the driver's seat.

A parking braking force warning method in some forms of the present disclosure may include operating, by the driver, a parking pedal or parking lever; warning, by the controller, the driver of vehicle slip; and operating, by the driver, a parking pedal or parking lever again.

Further, in the warning, by the controller, an actual parking braking force may be calculated, by the controller, from a stroke sensing value when operating, by the driver, the parking pedal or the parking lever, a vehicle weight, a slope where the vehicle is located and a friction coefficient of the brake pad; a required parking braking force may be calculated, by the controller, from the vehicle weight and the slope; determining, by the controller, whether the actual parking braking force is smaller than the required parking braking force; and warning, by the controller, the driver of the vehicle slip when the actual parking braking force is smaller than the required parking braking force.

Further, the friction coefficient may be measured in advance by the temperature of the brake pad through a number of experiments; and after measuring or estimating the temperature of the brake disk when operating the parking pedal or the parking lever, the friction coefficient of the brake pad at the temperature of the brake disk may be used to calculate the actual parking braking force.

Furthermore, the friction coefficient may be measured in advance by the temperature of the brake pad through a number of experiments; and the friction coefficient at the lowest temperature of the brake pad may be used to calculate the required parking braking force.

In accordance with the parking braking force warning method of the present disclosure configured as described above, since the controller warns the driver of a vehicle slip when the actual parking braking force is smaller than the required parking braking force and induces re-operation of the parking pedal or parking lever so that a braking force can be secured and it is able to prevent a vehicle from being pushed down along a ramp even if the vehicle is rapidly decelerating during high speed driving and parked on the ramp.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
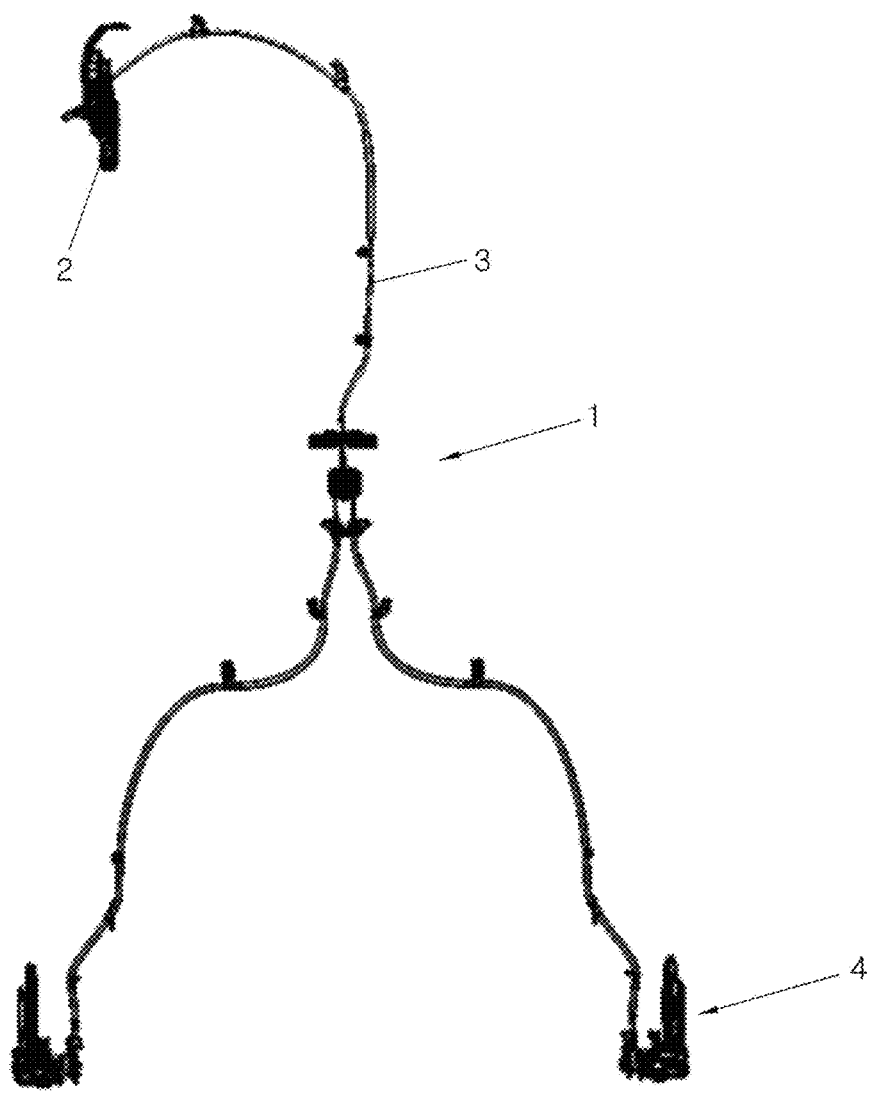
FIGS. 1 to 3 are example drawings of a typical mechanical parking brake.
Figure 2:
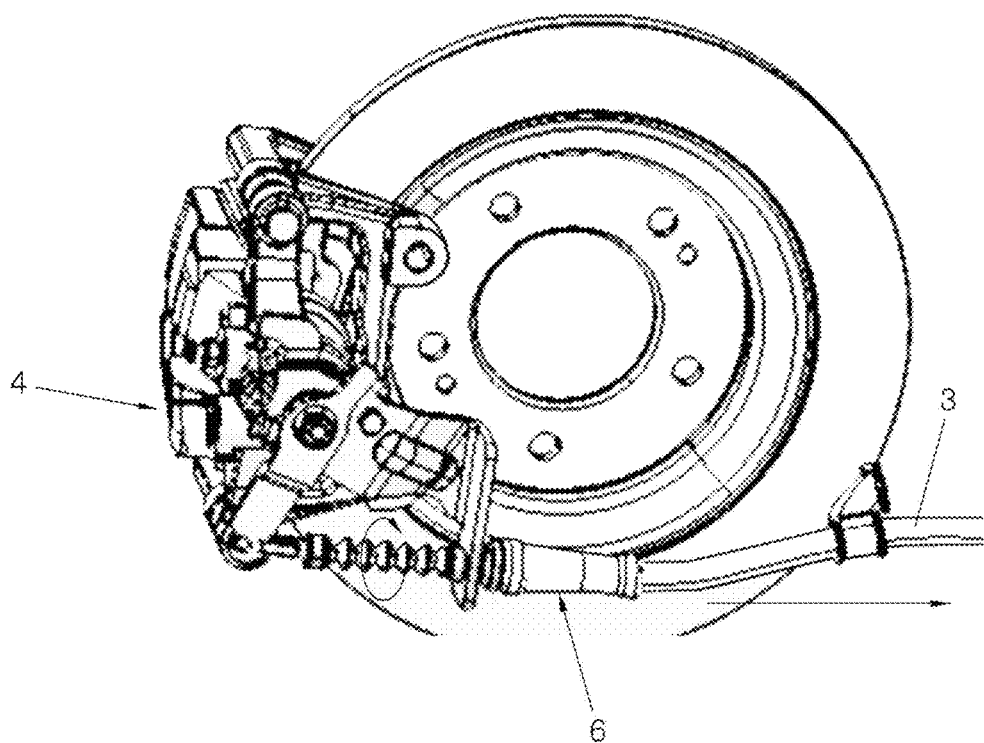
Figure 3:
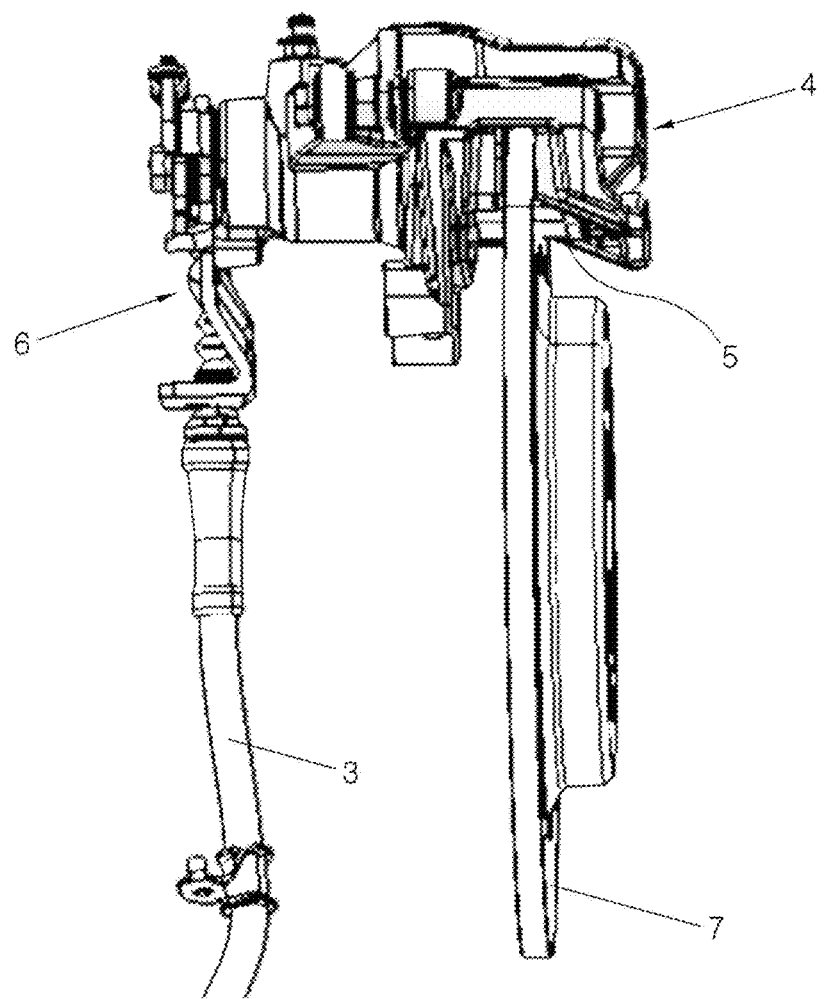

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a parking braking force warning method according to an exemplary form of the present disclosure will be described in detail with reference to accompanying drawings.

Figure 4:
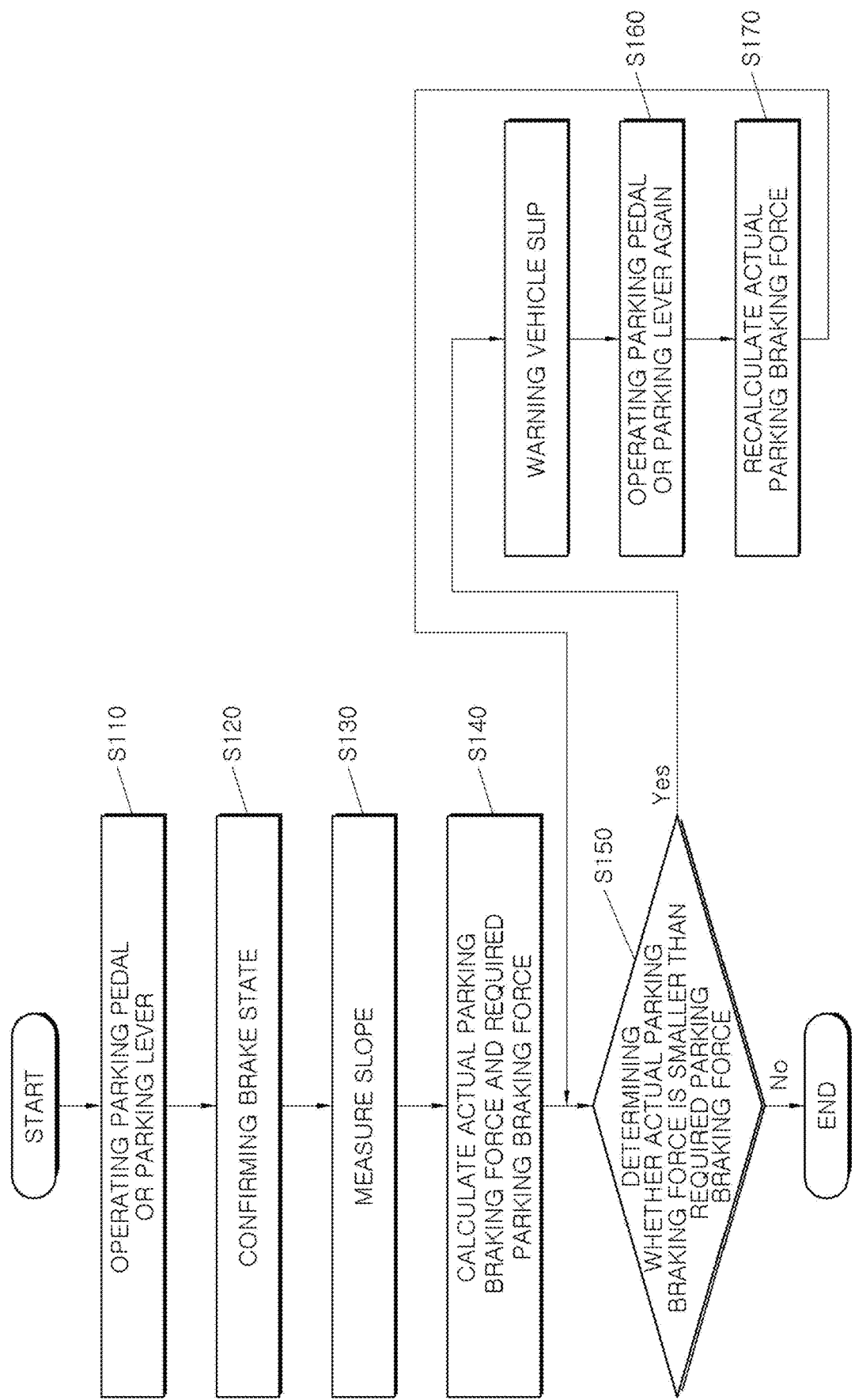
FIGS. 4 and 5 are flowcharts of a parking braking force warning method in one form of the present disclosure.
Figure 5:
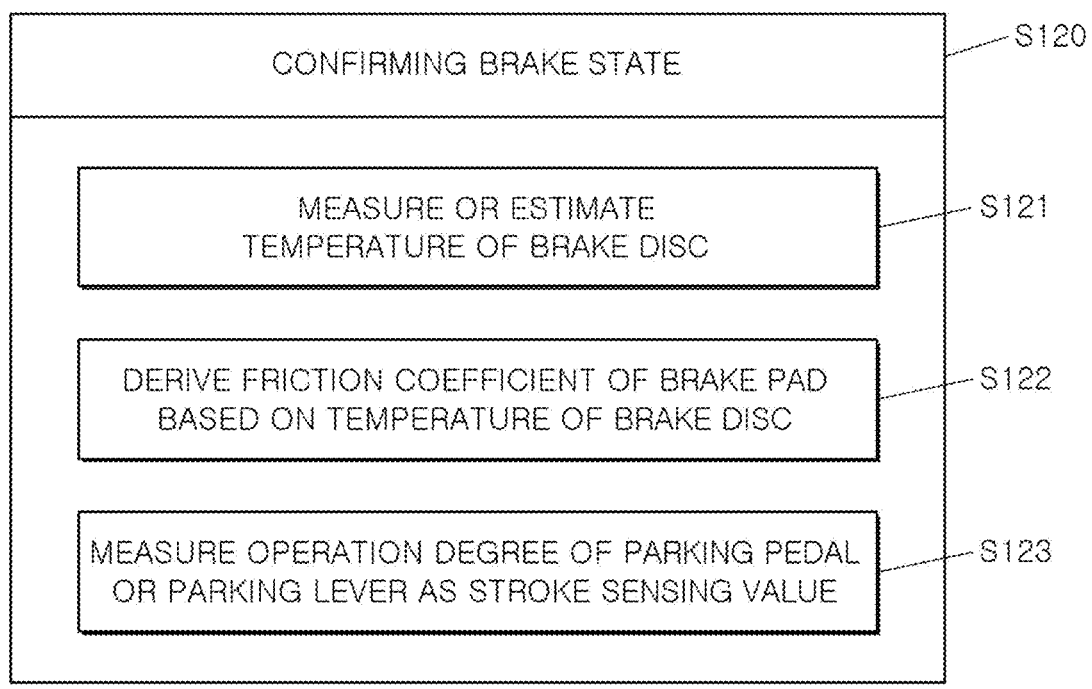

FIGS. 4 and 5 show flowcharts of a parking braking force warning method in some forms of the present disclosure. As shown in FIGS. 4 and 5, a parking braking force warning method in some forms of the present disclosure may include a step S110 of operating, by a driver, a parking pedal or a parking lever mounted on a vehicle, a step S120 of confirming, by the controller, a brake state of the vehicle, a step S130 of measuring, by the controller, the slope of the place where the vehicle is located, a step S140 of calculating, by the controller, an actual parking braking force of the vehicle and a required parking braking force of the vehicle, a step S150 of determining, by the controller, whether the actual parking braking force is smaller than the required parking braking force, a step S160 of operating, by the driver, the parking pedal or the parking lever again mounted on the vehicle, and a step S170 of recalculating, by the controller, the actual parking braking force. When the actual parking braking force or the recalculated actual parking braking force is smaller than the required parking braking force, the driver is alerted, by the controller, to vehicle slip.

In the step S110 of operating the parking pedal or the parking lever mounted on a vehicle, the parking pedal or parking lever is operated for parking by the driver.

In the step S120 of confirming, by the controller, the brake state of the vehicle, the parameters for calculating the actual parking braking force and the required parking braking force are measured and derived. The step S120 of confirming, by the controller, the brake state of the vehicle may include a step S121 of measuring or estimating, by the controller, the temperature of the brake disk mounted on the vehicle, a step S122 of deriving, by the controller, the friction coefficient of the brake pad mounted on the vehicle at the temperature of the brake disk and a step S123 in which the degree of manipulation of the parking pedal or the parking lever is measured, by the controller, as the stroke sensing value. In the step S123 in which the degree of manipulation of the parking pedal or the parking lever is measured, by the controller, as the stroke sensing value, the pressurizing force by which the brake pad presses the brake disk may be calculated from the stroke sensing value.

In the step S130 of measuring, by the controller, the slope of the place where the vehicle is located, the slope may be calculated from the signal generated by the acceleration sensor mounted on the vehicle.

In the step S140 of calculating, by the controller, the actual parking braking force of the vehicle and the required parking braking force of the vehicle, the actual parking braking force may be calculated from the vehicle weight, the slope, the friction coefficient of the derived brake pad and pressurizing force. The required parking braking force may be calculated from the vehicle weight and the slope.

In the S150 of determining, by the controller, whether the actual parking braking force is smaller than the required parking braking force actual parking braking force, when it is determined that actual parking braking force is smaller than the required parking braking force, a warning message may be displayed, by the controller, on an instrument panel to warn the driver of the vehicle slip. In some forms of the present disclosure, a warning sound may be generated in the driver's seat, which may alert the driver to a vehicle slip.

The warning may cause the driver to operate again the parking pedal or parking lever. In the step S160 of operating again, by the driver, the parking pedal or the parking lever mounted on the vehicle, the driver detecting the warning may operate again the parking pedal or parking lever. In the step S170 of recalculating, by the controller, the actual parking braking force, as the parking pedal or parking lever is operated again, the actual parking braking force may be recalculated with the modified stroke sensing value and pressurizing force and other variables, such as the vehicle weight, slope, and the derived friction coefficient of the brake pad.

The controller may be determined again whether the recalculated actual parking braking force is smaller than the required parking braking force. If the recalculated actual parking braking force is determined to be small relative to the required parking braking force, the driver may be alerted again, by the controller, to the vehicle slip occurrence.

Figure 6:
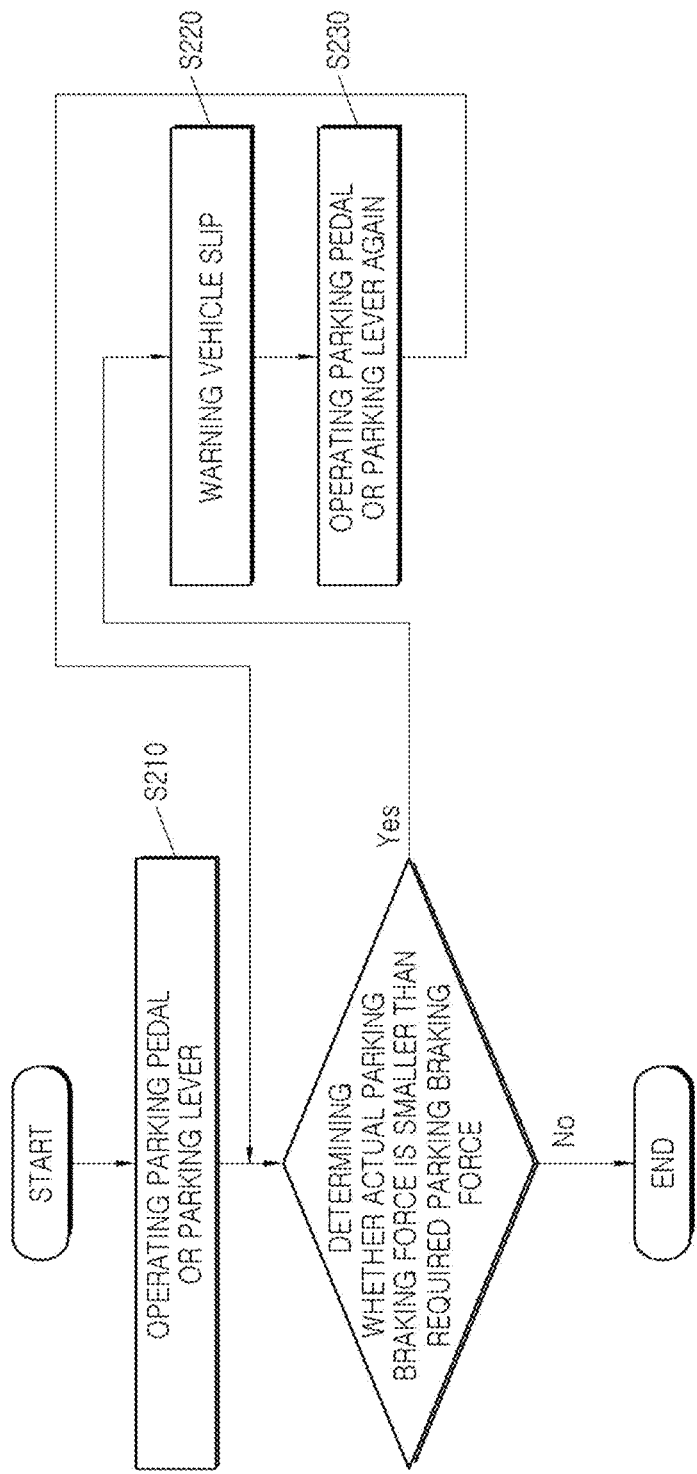
FIG. 6 is a flowchart of a parking braking force warning method in one form of the present disclosure.
Figure 7:
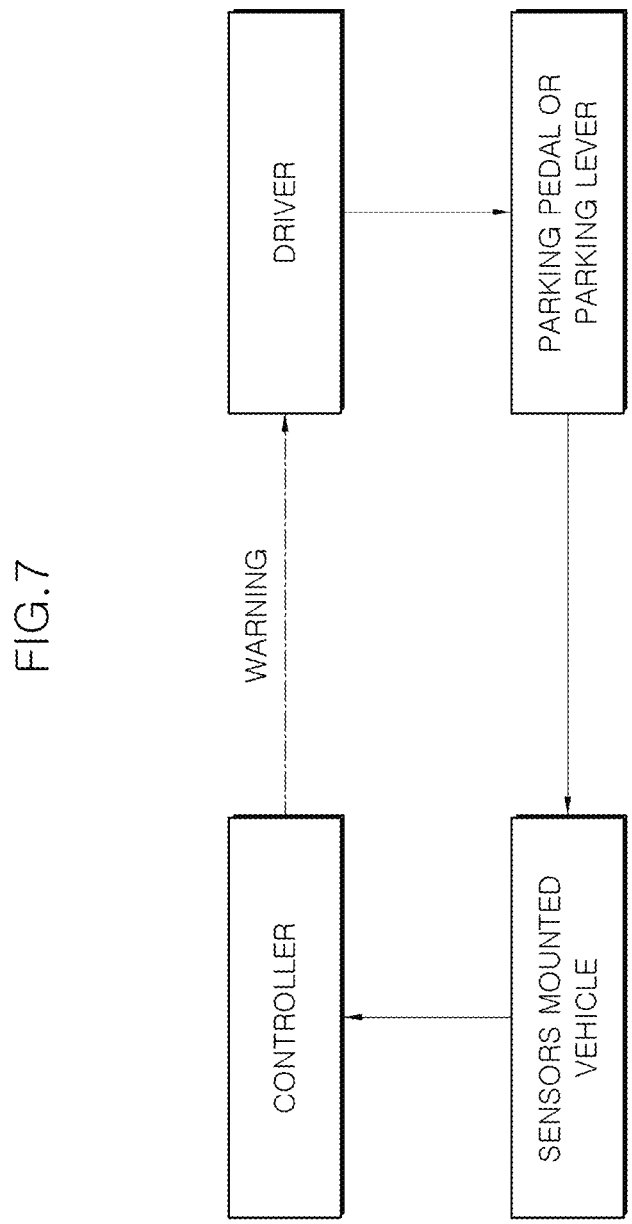
FIG. 7 is a block diagram showing the relationship between the controller and the parking pedal or the parking lever.

A flowchart of a parking braking force warning method in some forms of the present disclosure is shown in FIG. 6. As shown in FIG. 6, the parking braking force warning method in some forms of the present disclosure may include a step S210 of operating, by the driver, the parking pedal or parking lever, a step S220 of alerting, by the controller, the driver to vehicle slip and a step S230 of operating the parking pedal or parking lever again, by the driver.

In the step S220 of alerting the driver to vehicle slip, the actual parking braking force may be calculated, by the controller, from the measured stroke sensing value, the vehicle weight, the slope of the location where the vehicle is located, and the friction coefficient of the brake pad when operating the parking pedal or parking lever. The required parking braking force may be calculated, by the controller, from the vehicle weight and the slope of the location where the vehicle is located. In addition, it is determined, by the controller, that the actual parking braking force is smaller than the required parking braking force. When the actual parking braking force is smaller than the required parking braking force, the driver may be alerted, by the controller, to the vehicle slip. The vehicle slip warning may be implemented by displaying a warning phrase on the instrument panel or by generating a warning sound in the driver's seat.

The friction coefficient of the brake pad may be measured in advance by the temperature of the brake pad through a number of experiments, and may be provided as a graph, a diagram and an equation. When operating the parking pedal or parking lever, the temperature of the brake disk may be measured or estimated by the brake disk temperature estimation technique. It may be assumed that the measured or estimated brake disk temperature and brake pad temperature are the same. The friction coefficient of the brake pad at the brake disk temperature may be used to calculate the actual parking braking force. In addition, the friction coefficient at the lowest temperature of the brake pad may be used to calculate the required parking braking force.

The driver may be guided by a warning to operate the parking pedal or parking lever again. In the step S230 of operating the parking pedal or parking lever again, by the driver, after detecting the warning, the driver may operate the parking pedal or parking lever again.

In the step S230 of operating the parking pedal or parking lever again, by the driver, when operating the parking pedal or parking lever again, the actual parking braking force may be calculated again, by the controller, from the stroke sensing value measured again, vehicle weight, the slope where the vehicle is located and the friction coefficient of the brake pad.

In addition, the recalculated actual parking braking force may be compared with the previously calculated required parking braking force again, by the controller, and when the recalculated actual parking braking force is smaller than the required parking braking force, a warning is issued to warn the driver of the vehicle slip again.

The step S220 of alerting, by the controller, the driver to vehicle slip and the step S230 of operating the parking pedal or parking lever again, by the driver, may be repeated until the recalculated actual parking braking force is greater than the required parking braking force.

According to the parking braking force warning method of the present disclosure as configured above, if the actual parking braking force is smaller than the required parking braking force, the driver is alerted, by the controller, to the vehicle slip and induces an operation of the parking pedal or parking lever again so as to secure a braking force, thereby preventing the vehicle from being pushed down the ramp even if the vehicle is suddenly decelerated during high speed driving and parked on a ramp.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for providing a warning regarding sufficiency of a braking force for parking, the method comprising:
   confirming, by a controller, whether a parking pedal or a parking lever mounted on a vehicle is operated;
   confirming, by the controller, a brake state of the vehicle;
   measuring, by the controller, a slope of a place where the vehicle is located;
   calculating, by the controller, an actual braking force for parking of the vehicle and a required braking force for parking of the vehicle based on information of the vehicle and the slope, wherein the actual braking force for parking is calculated based on a vehicle weight, the slope, a determined friction coefficient of a brake pad in contact with a brake disk, and a pressurizing force, and the required braking force for parking is calculated based on the vehicle weight and the slope; and
   determining, by the controller, whether the actual braking force for parking is smaller than the required braking force for parking,
   wherein when the actual braking force for parking or a recalculated actual braking force for parking is smaller than the required braking force for parking, an output signal is generated from the controller to warn the driver of a vehicle slip,
   wherein after warning the driver, the method further comprises:
      operating, by the driver, the parking pedal or the parking lever mounted on the vehicle again;
      recalculating, by the controller, the actual braking force for parking; and
      determining again, by the controller, whether the recalculated actual braking force for parking is smaller than the required braking force for parking to warn the driver of the vehicle slip again,
   wherein confirming, by the controller, the brake state of the vehicle comprises:
      measuring or estimating, by the controller, a temperature of the brake disk mounted on the vehicle;
      determining, by the controller, the friction coefficient of the brake pad mounted on the vehicle based on the measured or estimated temperature of the brake disk; and
      measuring, by the controller, a degree of manipulation of the parking pedal or the parking lever as a stroke sensing value,
   wherein a pressurizing force by which the brake pad presses the brake disk is calculated, by the controller, based on the stroke sensing value,
   wherein the friction coefficient of the brake pad is determined in advance based on the measured or estimated temperature of the brake pad through a number of experiments, and
   wherein when the temperature of the brake disk is measured during operation of the parking pedal or the parking lever, the actual braking force for parking is calculated by using the friction coefficient.

2. The method of claim 1, wherein measuring the slope comprises:
   calculating the slope based on a signal generated by an acceleration sensor mounted on the vehicle.

3. The method of claim 1, wherein the warning the driver comprises:
   displaying a warning phrase on an instrument panel of a driver's seat or providing a warning sound to the driver's seat.

4. A method for providing a warning regarding sufficiency of a braking force for parking, the method comprising:
   operating, by a driver, a parking pedal or a parking lever;
   confirming, by a controller, a brake state of a vehicle;
   warning the driver of a vehicle slip by an output signal from the controller to display a warning phrase on an instrument panel; and
   operating the parking pedal or the parking lever again, by the driver,
   wherein confirming, by the controller, the brake state of the vehicle comprises:
      measuring or estimating, by the controller, a temperature of a brake disk mounted on the vehicle;
      determining, by the controller, a friction coefficient of a brake pad in contact with the brake disk mounted on the vehicle based on the measured or estimated temperature of the brake disk; and
      measuring, by the controller, a degree of manipulation of the parking pedal or the parking lever as a stroke sensing value,
   wherein a pressurizing force by which the brake pad presses the brake disk is calculated, by the controller, based on the stroke sensing value,
   wherein warning the driver of the vehicle slip comprises:
      calculating, by the controller, an actual braking force for parking based on the stroke sensing value, a vehicle weight, a slope where the vehicle is located, and the friction coefficient of the brake pad;
      calculating, by the controller, a required braking force for parking is based on the vehicle weight and the slope;
      determining, by the controller, whether the actual braking force for parking is smaller than the required braking force for parking; and
      when the actual braking force for parking is smaller than the required braking force for parking, the output signal is sent from the controller to generate a warning to the driver of a vehicle slip,
   wherein after warning the driver, the method further comprises:
      recalculating, by the controller, the actual braking force for parking when the driver operates again the parking pedal or the parking lever mounted on the vehicle; and
      determining again, by the controller, whether the recalculated actual braking force for parking is smaller than the required braking force for parking to warn the driver of the vehicle slip again,
   wherein the friction coefficient of the brake pad is determined in advance based on the measured or estimated temperature of the brake pad through a number of experiments, and
   wherein when the temperature of the brake disk is measured during operation of the parking pedal or the parking lever, the actual braking force for parking is calculated by using the friction coefficient.

5. The method of claim 4, wherein the method comprises:
   measuring the friction coefficient in advance based on the temperature of the brake pad through the number of experiments; and
   calculating the required braking force for parking by using the friction coefficient at a lowest temperature of the brake pad.

* * * * *